Dec. 10, 1940.  C. S. SHOEMAKER  2,224,236
COATING GLASS SHEETS
Filed April 26, 1939

INVENTOR
Charles S. Shoemaker
by his attys
Stebbins, Blenko & Parmelee

Patented Dec. 10, 1940

2,224,236

UNITED STATES PATENT OFFICE 2,224,236

COATING GLASS SHEETS

Charles S. Shoemaker, Jeannette, Pa., assignor to American Window Glass Company, Pittsburgh, Pa., a corporation of Pennsylvania Application April 26, 1939, Serial No. 270,201

6 Claims. (Cl. 91—13)

The present invention relates to the coating of glass sheets and, more particularly, to the coating of glass sheets to be used in the manufacture of laminated glass with a film or layer of strengthening material or an adhesive material. By the present invention I provide a method and apparatus whereby the glass sheets can be cleaned appropriately before the coating operation takes place so that dirt or foreign material will not be present on the glass sheets during the coating operation. While the present invention is not limited to the coating of glass sheets to be used in the manufacture of laminated glass, in order to facilitate the description of the invention it will be described as so applied.

A substantial proportion of the laminated glass now being manufactured is manufactured by the so-called "liquid" process. In this process the glass sheets are first appropriately cleaned by the various known types of scrubbing machines. Thereafter the glass sheets are passed by conveying mechanism beneath a filming feeder which flows or forms a film of strengthening material in liquid form thereon. The sheets are then passed through an elongated drying chamber where the coatings or films on the sheets are dried. Thereafter the coatings or films on the sheets are treated with a contacting agent and two coated sheets then placed together with the coatings or films juxtaposed. The excess contacting agent is squeezed from between the coatings by passing the formed sandwich between rolls. These rolls affect the preliminary contacting also. Thereafter the sandwich thus formed is subjected to heat or pressure or both in order to effect a satisfactory adhesion between the two films.

In carrying out this process considerable difficulty has been heretofore encountered due to the formation of bubbles in the coating of strengthening material. Sometimes these bubbles will form during the drying operation when the coating is subjected to heat to drive off the solvent and sometimes these bubbles do not form until during the subsequent operations. Regardless of where these bubbles form they are objectionable in a commercial product. Due to the fact that these bubbles do not appear until the drying operation, or subsequently thereto, attempts were made to eliminate them by modifying the solution of strengthening material, by altering the drying speeds and drying temperatures, and by wiping the glass sheets with a liquid before filming them. However, none of these expedients resulted in any substantial elimination of the bubbles. They continued to form despite the fact that the glass sheets were as carefully cleaned as possible prior to the coating or filming operation and despite the fact that extreme care was exercised in regard to the character of the strengthening material solution and the character of the drying and subsequent operations.

By the present invention I provide a method and apparatus whereby these bubbles can be eliminated. I found that by brushing each glass sheet and then subjecting the sheet to a vacuum before coating the sheet with the film of strengthening material these bubbles can be eliminated. In accordance with my invention the glass sheets are carefully and thoroughly cleaned by the known cleaning methods, then dried and then subjected to the brushing and vacuum. I do not understand fully why it is necessary to subject the glass sheets to treatment of this character but I believe that during the cleaning operation the glass sheets become charged with static electricity and that this charge causes the glass sheets to attract any dust particles which may be in the atmosphere, and that these dust particles adhere strongly to the glass sheet and form the nuclei of the bubbles. I have heretofore carried out the coating of glass sheets in a conditioned atmosphere which was substantially free of any dust and even taken great care that the glass sheets immediately after the cleaning operation and before the coating operation did not come in contact with an atmosphere other than a conditioned atmosphere, but despite these precautions, prior to the making of my invention, bubbles continued to form. This would seem to mitigate against the theory expressed above but nevertheless I believe the theory expressed to be the correct one because it is practically impossible to carry out manufacturing operations in an atmosphere which is absolutely free of dust. I believe that if there is any dust or dirt particles in the air within a reasonable distance of the glass sheets, due to the charge of static electricity imparted to them during the cleaning operation, they will attract these dust particles. In accordance with my invention the particles of dust or dirt which may be on the glass sheet are brushed loose and then removed by the vacuum apparatus positioned adjacent the brushing apparatus. In addition, I believe that the brushing operation serves to discharge the charge of static electricity which the glass sheets possess at this time.

Regardless of the applicable theory, I have found that in actual practice bubbles can be successfully eliminated by this invention immediately prior to the use of the invention. The commercial laminated glass manufactured by this liquid process contained an average of approximately 2.8 bubbles per square foot. By virtue of the use of the present invention bubbles were reduced to an average of .2 per square foot.

In the accompanying drawing I have shown, for purposes of illustration only, a preferred embodiment of my invention.

In the drawing

Figure 1:
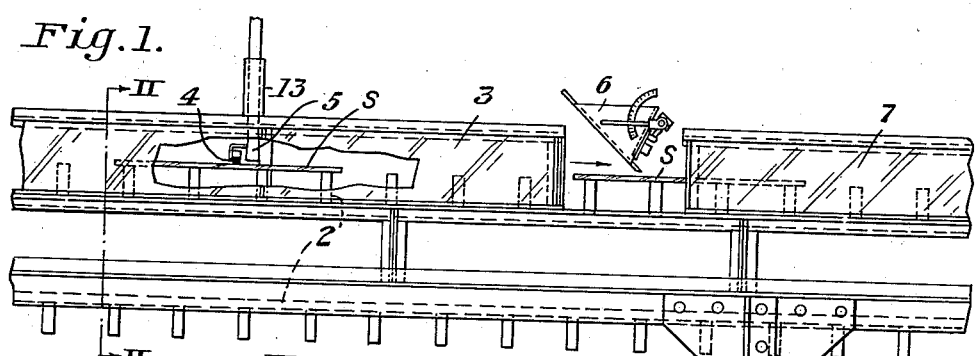
Figure 1 is a side elevation of apparatus used in carrying out my invention.
Figure 2:
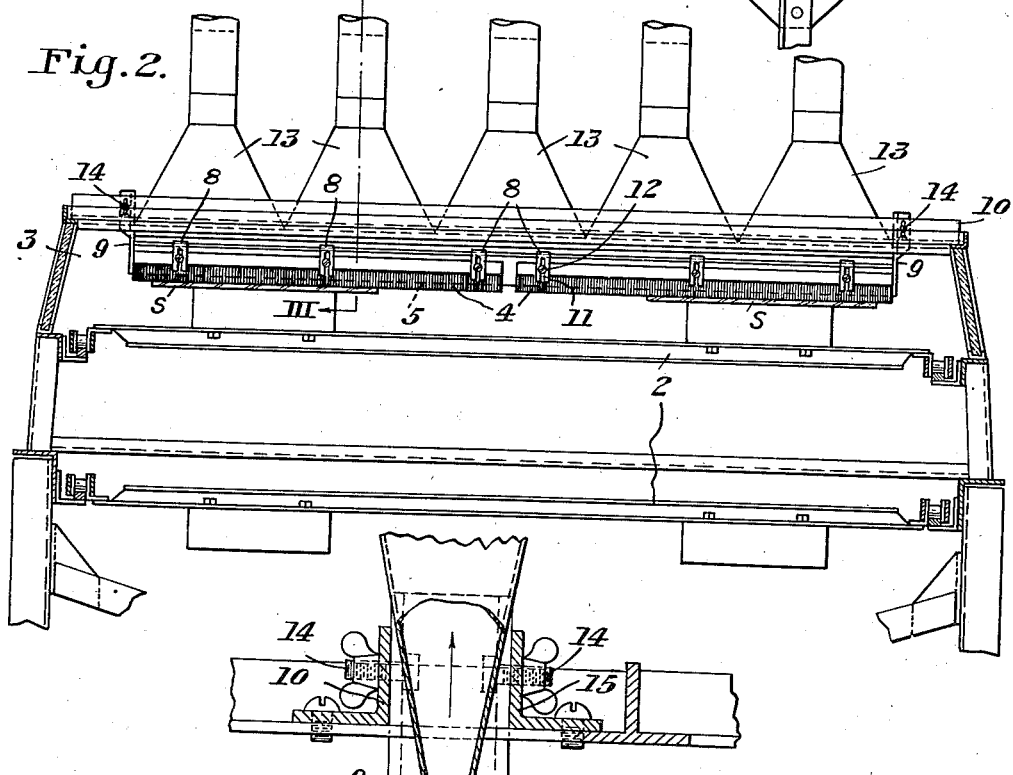
Figure 2 is a section taken along the line II—II of Figure 1.
Figure 3:
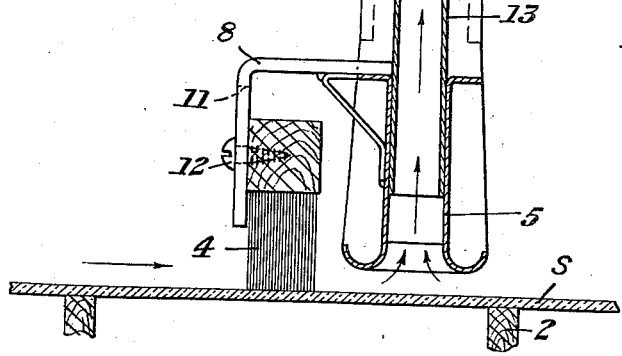
Figure 3 is a section taken along the line III—III of Figure 2.

As shown in the drawing, the glass sheets S are placed on a conveyor indicated generally by the reference character 2 and are carried thereby through a chamber 3. In the chamber 3 the glass sheets are carried by the conveyor past brushes 4 which brush the glass sheets to loosen any dirt or dust which may be held thereon by the charge of static electricity. The glass sheets are then immediately carried past a vacuum nozzle 5 which serves to remove from the glass sheets and from the atmosphere adjacent thereto any dust or dirt which may be present. The glass sheets are then passed beneath a filming feeder 6 which flows a film of liquid strengthening material on each sheet. The glass sheets then pass through the enclosed chamber 7 and from there pass on onto additional conveying means for carrying the glass sheets through the drying chamber.

The brushes 4 are supported on brackets 8 which are welded or otherwise suitably secured to the adjustable nozzle 5 which, in turn, is supported on adjustable brackets 9 carried by the transversely extending angle 10 which is supported by the side walls of the chamber 3. Each bracket 8 is provided with a vertically extending slot 11 through which the screw 12 passes. The screw 12 and the slot 11 will permit vertical adjustment of the brush independently of the nozzle 5. The brackets 9 are adjustable vertically so as to permit adjustment of both the nozzle and the brushes simultaneously, whereby the nozzle and brushes can be appropriately positioned to take care of glass of varying thicknesses.

The nozzle 5 cooperates with the lower end of each of a plurality of vertically extending ducts 13 which are connected to appropriate exhausting apparatus (not shown). The ducts 13 are supported in appropriate position by means of adjusting screws 14 carried by the transversely extending bracket 10 and a similar bracket 15. By this arrangement an appropriate adjustment of the ducts can be effected.

In operation, the glass sheets are carried past the brushes 4 where they are given a sufficient brushing to loosen any dirt or dust thereon and where at least a portion of the charge of static electricity carried by the glass sheets is discharged. The glass sheets then pass beneath the nozzle 5 which exhausts the air from adjacent the glass sheets that removes any dust therefrom. Thereafter the sheets pass beneath the flow machine and on to the drying apparatus.

While I have shown and described a preferred embodiment of my invention, it will be understood that it is not limited thereby and that it may be otherwise practiced or embodied within the scope of the appended claims.

I claim:

1. In apparatus for the manufacture of laminated glass, the combination of means for supporting and conveying a glass sheet, means for loosening particles of dust or dirt on said glass sheet, exhausting apparatus adjacent said loosening means for exhausting particles of dirt and dust from said glass sheet, and coating apparatus adjacent said loosening and exhausting means for flowing a film on said sheet thereafter, said coating apparatus and said exhausting apparatus being sufficiently close to each other that the coating is flowed on the glass sheet substantially immediately after the sheet passes the exhausting apparatus.

2. In apparatus for the manufacture of laminated glass, the combination of conveying mechanism for supporting and transporting a glass sheet, a brush positioned adjacent the path of travel of the glass sheet, exhausting apparatus adjacent said brush for exhausting the air adjacent the glass sheet and any dust or dirt particles loosened by said brush, and means adjacent said brush and exhausting apparatus for flowing a film of a liquid on the glass sheet after it has been brushed and subjected to said exhausting apparatus, said film flowing means and said exhausting apparatus being sufficiently close to each other that the film is flowed on the glass sheet substantially immediately after the sheet passes the exhausting apparatus.

3. In apparatus for the manufacture of laminated glass, the combination of means for supporting a glass sheet in a substantially horizontal position, a brush adjacent said supporting means and arranged to brush the glass sheet as it is carried thereby, exhausting means positioned adjacent said brush for exhausting air and dirt from adjacent the surface of the glass sheet, means adjacent said exhausting means for flowing a film of a liquid on the glass sheet, and means for moving the support successively past the brush, the exhausting means and the filming means, said film-flowing means and said exhausting means being sufficiently close to each other that the film is flowed on the glass sheet substantially immediately after the sheet passes the exhausting means.

4. In the manufacture of laminated glass, the steps comprising brushing one surface of a glass sheet to loosen dirt particles which may be on said surface, thereafter exhausting the air and dirt from adjacent the brushed face of said glass sheet, and substantially immediately thereafter forming a film of a liquid strengthening material on the thus cleaned glass sheet.

5. In the manufacture of laminated glass the steps comprising loosening dirt particles adhering to one surface of the glass sheet, immediately thereafter removing the dirt from the glass sheet by exhausting apparatus, and substantially immediately thereafter coating the glass sheet with a film of a strengthening material.

6. In the manufacture of laminated glass, the steps comprising first loosening dust particles adhering to one surface of the sheet, thereafter subjecting the treated surface to exhausting apparatus, substantially immediately thereafter forming a film of a strengthening material on the thus treated surface of the glass sheet and thereafter drying the film.

CHARLES S. SHOEMAKER.